(12) United States Patent
Evans et al.

(10) Patent No.: US 11,427,372 B2
(45) Date of Patent: Aug. 30, 2022

(54) CONTAINER WITH SCUFF RESISTANT TEXTURE

(71) Applicant: GRAHAM PACKAGING COMPANY, L.P., Lancaster, PA (US)

(72) Inventors: Alicia Evans, Loveland, OH (US); Tapan Y. Patel, Nashua, NH (US); Hassan Mourad, Canton, MI (US); Jesus Gustavo Herrera Perez, Hidalgo (MX); Jose Manuel Diaz, York, PA (US)

(73) Assignee: Graham Packaging Company, L.P., York, PA (US)

( * ) Notice: Subject to any disclaimer, the term of this patent is extended or adjusted under 35 U.S.C. 154(b) by 70 days.

(21) Appl. No.: 16/944,436

(22) Filed: Jul. 31, 2020

(65) Prior Publication Data

US 2020/0361653 A1    Nov. 19, 2020

Related U.S. Application Data

(63) Continuation of application No. 15/453,802, filed on Mar. 8, 2017, now Pat. No. 10,752,396, which is a continuation of application No. PCT/US2014/068530, filed on Dec. 4, 2014.

(51) Int. Cl.
| | |
|---|---|
| *B65D 1/44* | (2006.01) |
| *B65D 1/02* | (2006.01) |
| *B29C 49/00* | (2006.01) |
| *B29K 67/00* | (2006.01) |
| *B29L 31/00* | (2006.01) |

(52) U.S. Cl.
CPC ............... *B65D 1/44* (2013.01); *B29C 49/00* (2013.01); *B65D 1/0223* (2013.01); *B29K 2067/003* (2013.01); *B29L 2031/7158* (2013.01)

(58) Field of Classification Search
CPC .. B65D 1/40; B65D 1/44; B65D 2501/24566; B65D 2501/0018; B65D 1/0223
See application file for complete search history.

(56) References Cited

U.S. PATENT DOCUMENTS

| | | | |
|---|---|---|---|
| 7,926,243 | B2 | 4/2011 | Kelley et al. |
| 8,096,098 | B2 | 1/2012 | Kelley et al. |
| 8,171,701 | B2 | 5/2012 | Kelley et al. |

(Continued)

FOREIGN PATENT DOCUMENTS

WO      2014113371      7/2014

OTHER PUBLICATIONS

International Search Report dated Feb. 24, 2015 received in International Application No. PCT/US2014/68530.

*Primary Examiner* — Andrew T Kirsch
(74) *Attorney, Agent, or Firm* — Stadley Ronon Stevens & Young, LLP

(57) ABSTRACT

Polymeric container includes a base defining a support surface and a sidewall extending upwardly from the base. The sidewall has at least a first contact portion extending about a perimeter of the sidewall. The sidewall includes a raised surface pattern at a select area proximate the first contact portion. The raised surface pattern includes a plurality of protrusions extending outwardly from the sidewall and having an outer surface. Each protrusion is spaced apart from adjacent protrusions within the selected area, and a shortest distance between each protrusion and any of the adjacent protrusions is less than a greatest surface dimension of the outer surface of each protrusion.

39 Claims, 15 Drawing Sheets

(56) References Cited

U.S. PATENT DOCUMENTS

2006/0032569 A1    2/2006   Zimmer et al.
2010/0326950 A1   12/2010   Lane
2011/0049085 A1    3/2011   Lembke
2011/0089135 A1    4/2011   Simon et al.
2011/0303572 A1   12/2011   Rajpoot

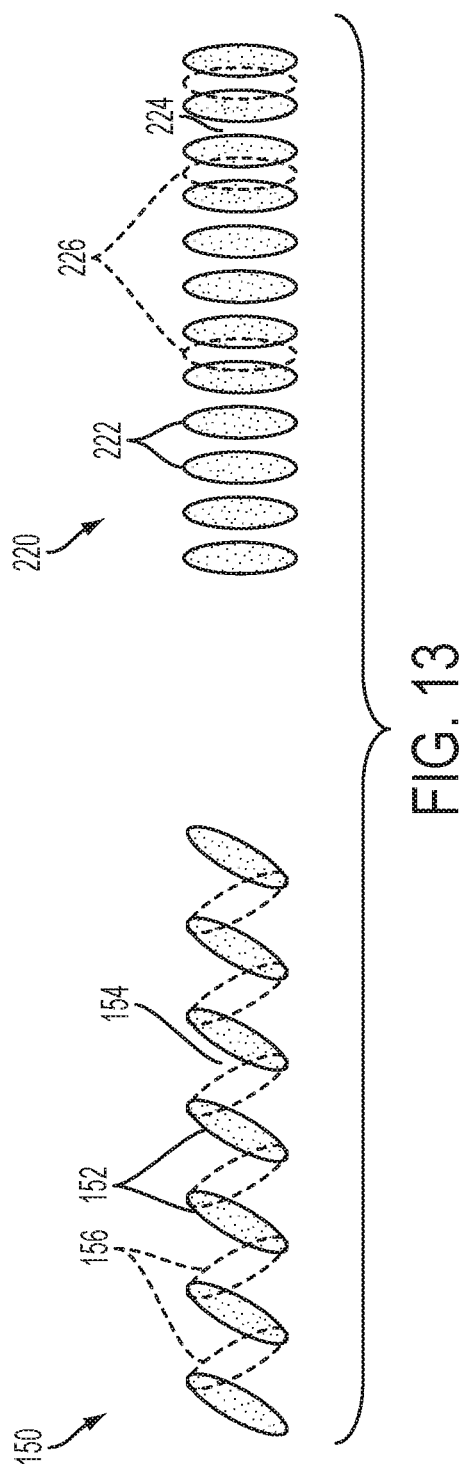

CONTAINER WITH SCUFF RESISTANT TEXTURE

CROSS-REFERENCE TO RELATED APPLICATIONS

This application is a continuation of U.S. patent application Ser. No. 15/453,802, filed Mar. 8, 2017, which is a continuation of International Application No. PCT/US2014/068530, filed Dec. 4, 2014, the full disclosures of which are hereby incorporated by reference.

BACKGROUND

Field of the Disclosed Subject Matter

The disclosed subject matter generally relates to polymeric containers and techniques for forming polymeric containers and the like. Particularly, the disclosed subject matter relates to a polymeric containers and techniques to reduce or prevent aesthetic damage due to surface contact.

Description of Related Art

Polymeric containers, such as bottles, are widely used for a variety of purposes. Such polymeric containers can be provided with various features to enhance performance and life span. For example, polymeric containers can be configured with one or more bumper or "stable touch point" portions (herein, "contact portions") for contact with adjacent bottles or the like. Exemplary containers with such features are disclosed in U.S. Pat. Nos. 7,926,243; 8,096,098; and 8,171,701; each of which is incorporated by reference herein in its entirety. During conventional processing and filling, such bottles generally will rub against each other or other hard surfaces, thereby wearing and marking the outer surface of the contact portions. Often, such bottles may be returned for subsequent refilling and use. After a number of iterations of this process, the bottle generally will be unusable due to the extent of aesthetic damage to the contact portions.

Various techniques have been attempted to reduce aesthetic damage to contact portions of polymeric containers, which can include incorporating additives, such as slip agents, anti-static agents, or the like, into the polymeric resin during preform injection molding stage. However, there remains a continued need for improved containers and techniques to reduce or prevent aesthetic damage due to surface contact.

SUMMARY

In accordance with certain embodiments of the disclosed subject matter, a polymeric container is provided. The polymeric container includes a base defining a support surface and a sidewall extending upwardly from the base. The sidewall has at least a first contact portion extending about a perimeter of the sidewall. The sidewall includes a raised surface pattern at a select area proximate the first contact portion, the raised surface pattern including a plurality of protrusions extending outwardly from the sidewall and having an outer surface, each protrusion spaced apart from adjacent protrusions within the selected area, a shortest distance between each protrusion and any of the adjacent protrusions being less than a greatest surface dimension of the outer surface of each protrusion.

As embodied herein, the first contact portion can be formed as a bumper proximate the base. The polymeric container can further include a second contact portion spaced from the first contact portion along a height of the sidewall. In some embodiments, the selected area can be disposed proximate the second contact portion and/or proximate both contact portions. Furthermore, the first contact portion and/or second contact portion, if provided, can be formed as at least one flute along a height of the sidewall.

Additionally, and as embodied herein, some or all protrusions of the surface pattern can each have a circular shape. The plurality of protrusions can be similar in size. Additionally or alternatively, the plurality of protrusions can vary in size.

In some embodiments, some or all protrusions of the surface pattern can each have an elliptical shape. The plurality of protrusions can be similar in size. Additionally or alternatively, the plurality of protrusions can vary in size. Additionally, and as embodied herein, some or all protrusions of the surface pattern can each have an irregular shape.

Furthermore, and as embodied herein, the selected area can have a geometrically uniform boundary proximate the first contact portion, such as in the form of a band-like boundary of uniform height. Alternatively, the selected area can have an irregular boundary proximate the first contact portion, such as a boundary of varied heights.

In addition, and as embodied herein, the first contact portion can have a percent haze measurement within a range of about 22 percent to 31 percent after engaging a similarly-configured container at 60 rpm for 15 minutes.

Additionally, and as embodied herein, each protrusion can be spaced apart from each adjacent protrusion to define a recess therebetween, and each protrusion can be sized such that none of the protrusions fits entirely within any of the recesses.

Further in accordance with the disclosed subject matter, a method of blow-molding a polymeric container is provided. The method of blow-molding a polymeric container includes providing a base defining a support surface, forming a sidewall extending upwardly from the base, the sidewall having at least a first contact portion extending about a perimeter of the sidewall, and forming a raised surface pattern at a select area proximate the first contact portion, the raised surface pattern comprising a plurality of protrusions spaced within the selected area. The polymeric container can be formed having any of the features described herein.

BRIEF DESCRIPTION OF THE DRAWINGS

FIGS. 5-14B each is a schematic diagram illustrating an exemplary surface pattern according to the disclosed subject matter, respectively.

DETAILED DESCRIPTION

The apparatus and methods presented herein can be used for a variety of polymeric containers, having various shapes, sizes and intended uses, such as polymeric containers for liquids, and particularly beverages. The containers described herein can be formed from materials including, but not limited to, polyethylene terephthalate (PET), polyethylene naphthalate (PEN) and PEN-blends, polypropylene (PP), high-density polyethylene (HDPE), among others and combinations thereof. Furthermore, various additives or surfactants can be used, such as monolayer blended scavengers or other catalytic scavengers as well as multi-layer structures including discrete layers of a barrier material, such as nylon or ethylene vinyl alcohol (EVOH) or other oxygen scavengers.

In accordance with the disclosed subject matter herein, the disclosed subject matter includes a polymeric container. The polymeric container includes a base defining a support surface and a sidewall extending upwardly from the base. The sidewall has at least a first contact portion extending about a perimeter of the sidewall. The sidewall includes a raised surface pattern at a select area proximate the first contact portion, the raised surface pattern including a plurality of protrusions extending outwardly from the sidewall and having an outer surface, each protrusion spaced apart from adjacent protrusions within the selected area, a shortest distance between each protrusion and any of the adjacent protrusions being less than a greatest surface dimension of the outer surface of each protrusion.

Reference will now be made in detail to the various exemplary embodiments of the disclosed subject matter, exemplary embodiments of which are illustrated in the accompanying drawings. A method of forming the polymeric containers of the disclosed subject matter will be described in conjunction with the detailed description of the system.

Figure 1A:
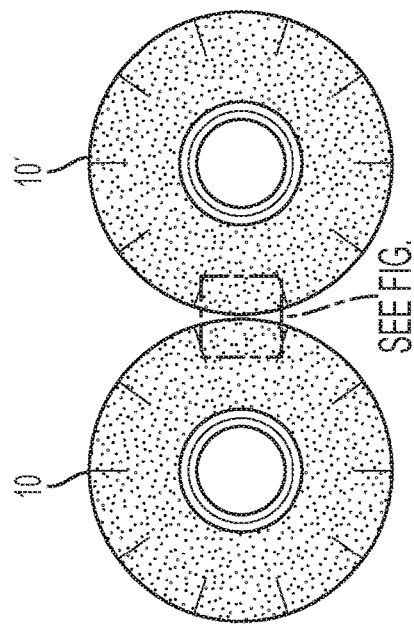
FIG. 1A is a top view of a conventional polymeric container, for purpose of comparison with the disclosed subject matter.
Figure 1B:
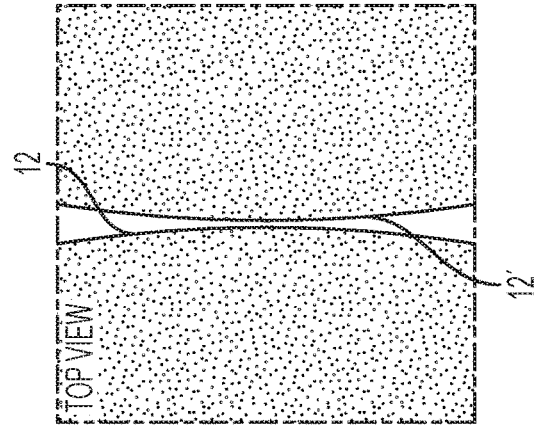
FIG. 1B is an enlarged view of region 1B of FIG. 1A.

The accompanying figures, where like reference numerals refer to identical or functionally similar elements throughout the separate views, serve to further illustrate various embodiments and to explain various principles and advantages all in accordance with the disclosed subject matter. Hence, features depicted in the accompanying figures support corresponding features and combinations thereof of the claimed subject matter. For purpose of explanation, an exemplary embodiment of a conventional polymeric container is depicted in FIGS. 1A-1B, whereas for purpose of explanation and illustration, and not limitation, exemplary embodiments of the polymeric container in accordance with the disclosed subject matter are shown in FIGS. 2A-20E. The polymeric containers are suitable for the manufacture of containers such as, bottles, jars and the like. Such containers can be used with a wide variety of perishable and nonperishable goods. However, for purpose of understanding, and not limitation, reference will be made to the use of the polymeric container disclosed herein with liquid or semi-liquid beverages and food products such as sodas, juices, sports drinks, energy drinks, teas, coffees, sauces, dips, jams and the like, including containers suitable for and configured to be pressure filled and re-filled with a hot liquid or non-contact (i.e., direct drop) filler, such as a non-pressurized filler. Containers of the disclosed subject matter can be used for transporting, serving, storing, and/or re-using such products while maintaining a desired shape, including providing a contact portion or surface on the container to prevent or inhibit aesthetic damage due to surface contact with similarly-configured containers or other hard surfaces. As described in further detail below, the container can have a base configuration and/or side wall features to provide improved sensitivity and controlled deformation from applied forces, for example resulting from pressurized filling, sterilization or pasteurization and resulting thermal expansion due to hot liquid contents and/or vacuum deformation due to cooling of a liquid product filled therein. Examples of such features, which can be incorporated in the container of the disclosed subject matter, are disclosed in International Patent Application No. PCT/US14/011433, which is incorporated by reference herein in its entirety. For purpose of illustration, and not limitation, reference will be made herein to a polymeric container that is intended to be filled, and may be re-filled, with a liquid product, such as a carbonated soft drink, tea, sports drink, energy drink or other similar liquid product.

For purpose of comparison to and illustration of the disclosed subject matter, referring to a conventional polymeric container illustrated in FIGS. 1A-1B, a polymeric container 10 includes a contact portion 12. As shown in FIGS. 1A-1B, an adjacent, similarly configured polymeric container 10' with a contact portion 12' can be disposed proximate to and rub against contact portion 12 of polymeric container 10. As a result, wearing and marking of the outer surface of the polymeric containers 10, 10' proximate contact portions 12, 12' can occur.

Figure 2A:
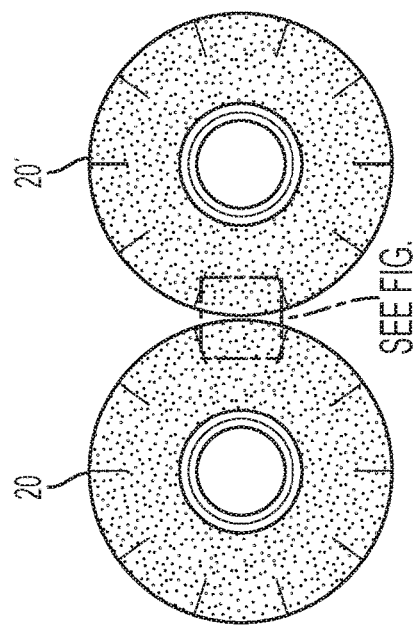
FIG. 2A is a top view of an exemplary polymeric container in accordance with the disclosed subject matter.
Figure 2B:
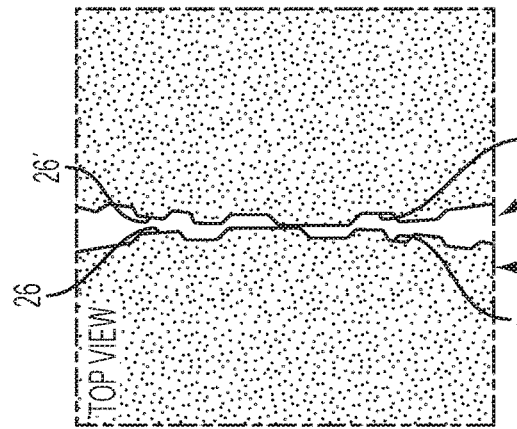
FIG. 2B is an enlarged view of region 2B of FIG. 2A.

Referring now to an illustrative embodiment of FIGS. 2A-2B, a polymeric container 20 includes a contact portion 22 including a raised surface pattern 26 at a select area proximate the contact portion 22, as described further below. As shown in FIGS. 2A-2B, an adjacent, similarly configured polymeric container 20' with a contact portion 22' including a raised surface pattern 26' at a select area can be disposed proximate to and rub against contact portion 22 including raised surface pattern 26. In this manner, and as discussed further herein, raised surface pattern 26 can reduce or prevent aesthetic damage, such as wearing and marking of the outer surface of polymeric containers 20, 20' proximate contact portions 22, 22', for example by locating and distributing the points of contact at the select area disposed proximate contact portions 22, 22'. As discussed further, and as embodied herein, when contact portions 20, 20' contact each other, generally the raised surface pattern 26 rubs against the raised surface pattern 26', and remaining lower portions 24, 24' of the contact portions 22, 22' generally do not contact each other. As such, wearing and marking of the polymeric containers 20, 20' can be reduced or prevented, at least in the area of lower portions 24, 24' of the contact portions 22, 22'.

Figure 3A:
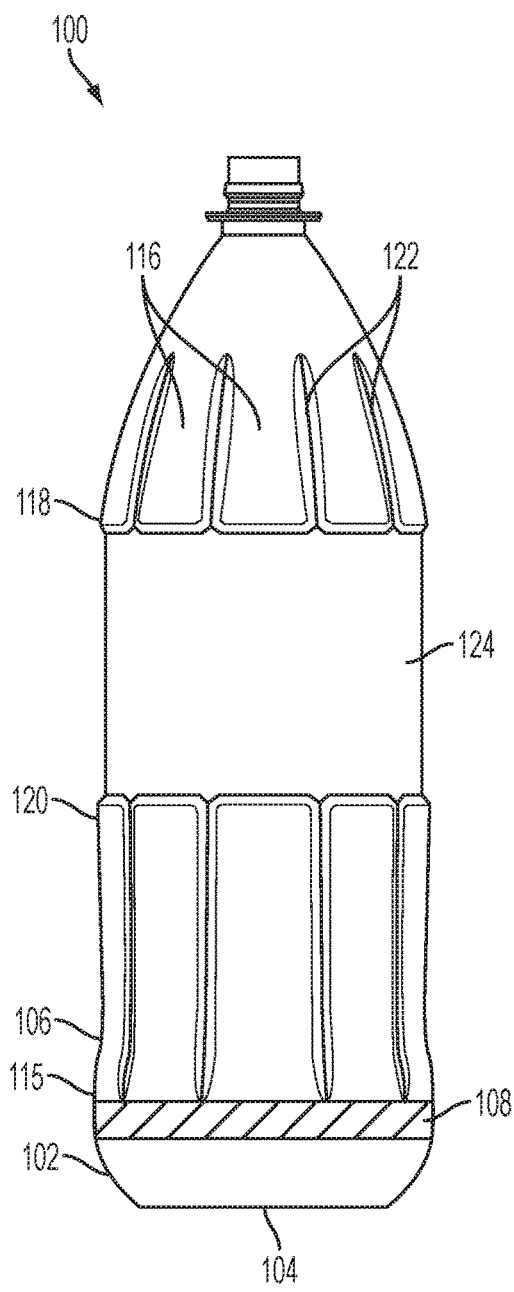
FIG. 3A is a front view of an exemplary polymeric container in accordance with the disclosed subject matter.

Referring now to FIG. 3A, an exemplary polymeric container 100 according to the disclosed subject matter is illustrated. Polymeric container 100 includes a base 102 defining a support surface 104. A sidewall 106 extends upwardly from base 104. A first contact portion 108 extends about a perimeter of sidewall 106. For example, and as embodied herein, first contact portion 108 can be formed in a bumper portion 115 proximate base 104. Additional or alternative, contact portions 118, 120 can be defined along the length of sidewall 106. For example, and as embodied herein a number of indentations 122 extending along the length of and spaced circumferentially about sidewall 106 can define a number of flutes 116 therein. Contact portions 118, 120 can thus be formed proximate to or at least partially within flutes 116. Flutes 116 can be separated along their length by a circumferential recess 124, which can be substantially smooth and sized to receive a label therein. In this manner, contact portions 118, 120 can be defined proximate to and on opposing sides of recess 124.

Although it is understood that additional or alternative contact portions can be formed anywhere along the length of sidewall 106, generally contact portions can be formed proximate portions of the sidewall 106 having a relatively greater cross dimension such that the contact portions can engage an adjacent and proximate hard surface, such as a container 100 of similar configuration, or any other suitable hard surface. As such, it is further understood that container 100 can have a single contact portion, such as extending around a circumference or perimeter of container 100 in plan view. Additionally or alternatively, any suitable number of a plurality of contact portions can be spaced apart along the height of sidewall 106 and/or about the circumference or perimeter.

Figure 3B:
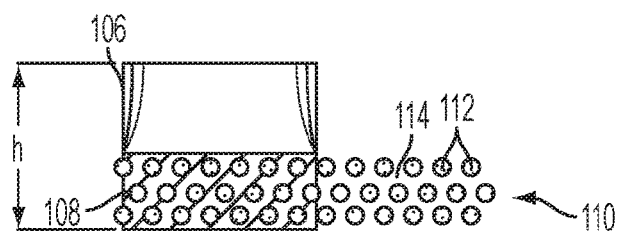
FIG. 3B is an enlarged schematic view of region 3 of FIG. 3A, with an exemplary surface pattern illustrated thereon.

Referring now to FIG. 3B, sidewall 106 includes a raised surface pattern 110 at a select area proximate the contact portion 108. As embodied herein, the select area can extend about the circumference of the container 100 proximate the contact portion 108, such as to form a band-like boundary. Furthermore, the select area can extend to a height h within the contact portion 108. In this manner, the select area including the raised surface pattern 110 can have a geometrically uniform boundary proximate the contact portion 108, such as to form the band-like boundary. Alternatively, the selected area can have an irregular boundary proximate the contact portion 108, such as an S-shaped boundary, an undulating jagged boundary, or any other suitable boundary or shape.

The raised surface pattern 110 includes a plurality of protrusions 112 spaced apart within the select area proximate contact portion 108. As embodied herein, the spacing of the protrusions 112 can correspond to a greatest surface dimension of the outer surface of the protrusion 112. For example, and as embodied herein, the greatest surface dimension can correspond to the length or largest diameter of the outer surface of the protrusions 112, as illustrated herein. For example, and as embodied for illustration in FIG. 3B, each protrusion 112 can have a circular shape. Furthermore, and as embodied herein, each protrusion 112 can have a similar size, for example with a greatest surface dimension, embodied herein as a diameter of 0.1163". Alternatively, and as described herein, each protrusion 112 can have one of a variety of different sizes and shapes, including any suitable regular or irregular shapes.

Figure 3C:
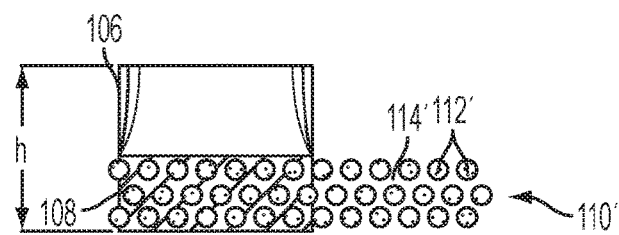
FIG. 3C is an enlarged schematic view of region 3 of FIG. 3A, with another exemplary surface pattern illustrated thereon.

For example, and for purpose of comparison, FIG. 3C depicts a raised surface pattern 110' having protrusions 112' with a circular shape, similar center-to-center spacing and a greater surface diameter compared to protrusions 112 of FIG. 3B. As such, the edge-to-edge spacing between protrusions 112' is reduced compared to protrusions 112. As embodied herein, protrusions 112' can have a greatest surface dimension corresponding to a diameter of 0.1401". Furthermore, protrusions 112' compose a larger portion of the surface area of contact portion 108 than protrusions 112. That is, protrusions 112 of FIG. 3B compose about 35% of the surface area of contact portion 108, with the remaining about 65% of the surface area being recessed lower portions 114 relative to the protrusions 112'. By comparison, protrusions 112' of FIG. 3C compose about 50% of the surface area of contact portion 108, with the remaining about 50% of the surface area being recessed lower portions 114' relative to protrusions 112'.

Figure 3D:
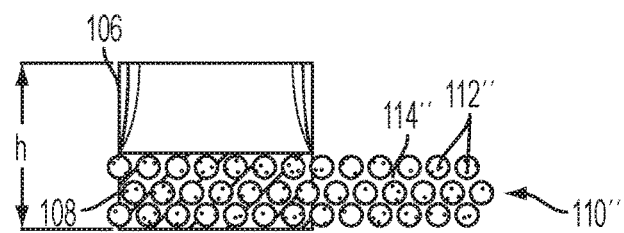
FIG. 3D is an enlarged schematic view of region 3 of FIG. 3A, with another exemplary surface pattern illustrated thereon.

Furthermore, and for further comparison, FIG. 3D depicts a raised surface pattern 110" having protrusions 112" with a circular shape, similar center-to-center spacing and a greater surface diameter compared to protrusions 112, 112' of FIGS. 3B-3C, respectively. As such, the edge-to-edge spacing between protrusions 112" is reduced compared to protrusions 112, 112'. As embodied herein, protrusions 112" can have a greatest surface dimension corresponding to a diameter of 0.1614". Furthermore, protrusions 112" compose a larger portion of the surface area of contact portion 108 than protrusions 112, 112'. For example, protrusions 112" compose about 65% of the surface area of contact portion 108, with the remaining about 65% of the surface area being recessed lower portions 114" relative to the protrusions 112". Additionally, and as described further herein, in each of the raised surface patterns 110, 110', 110", protrusions 112, 112', 112" can be spaced apart from any adjacent protrusions 112, 112', 112" less than the greatest surface dimension of each protrusion 112, 112', 112". As such, a similarly configured protrusion 112, 112', 112" generally cannot fit within the recessed space 114, 114', 114" defined by protrusions 112, 112', 112", respectively.

Figure 15:
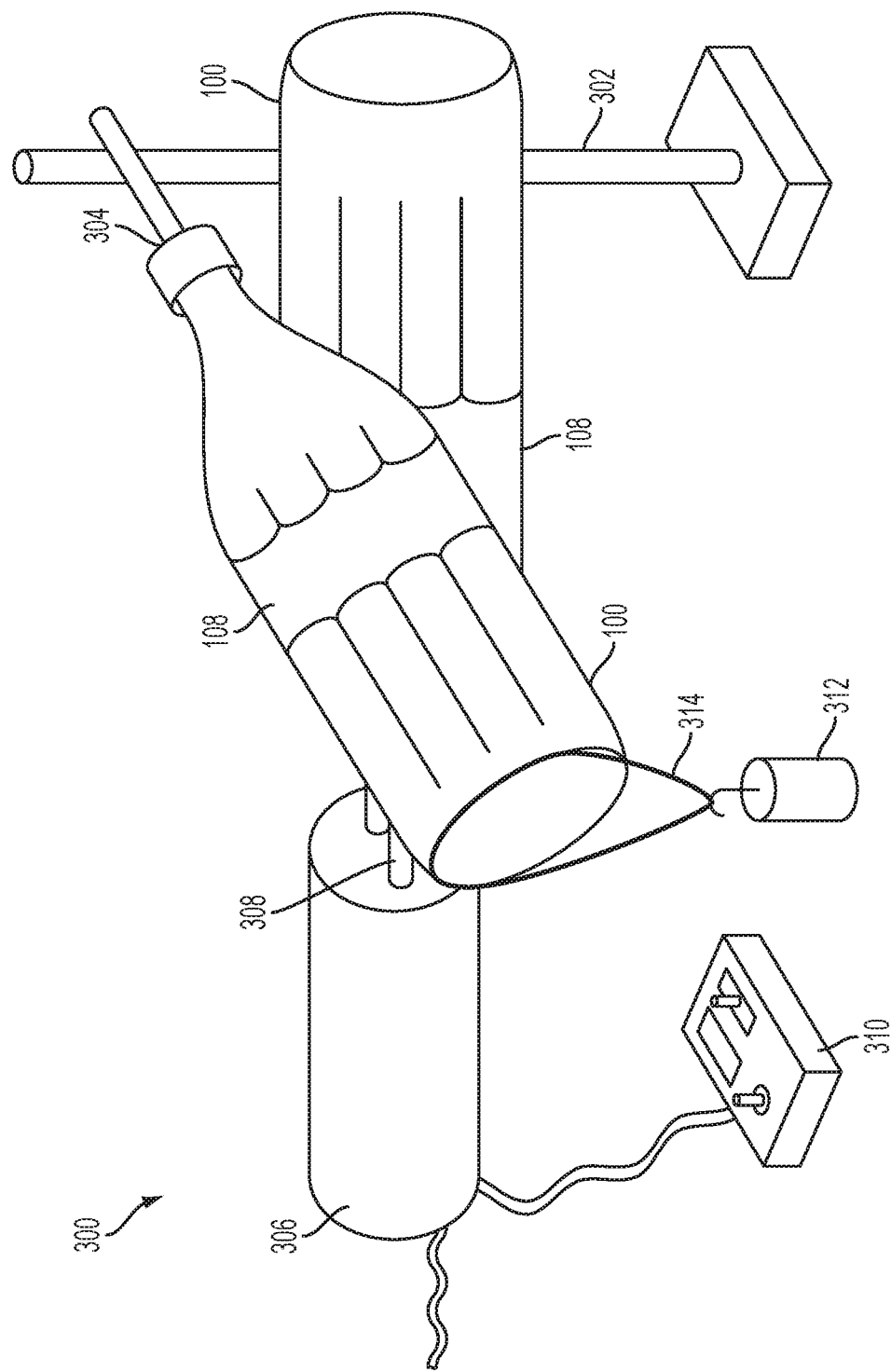
FIG. 15 is a diagram illustrating an exemplary scuffing apparatus according to the disclosed subject matter.
Figure 16:
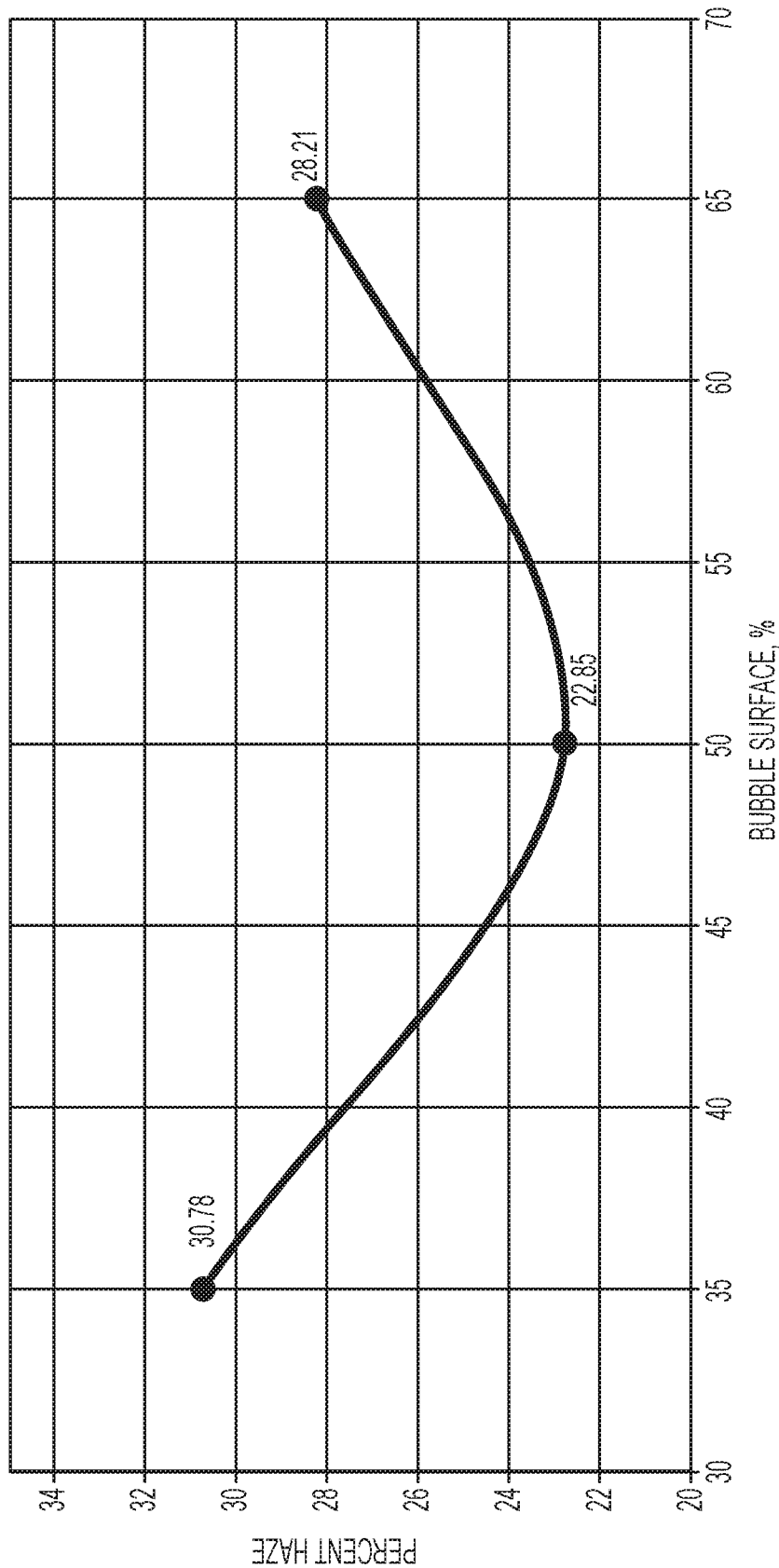
FIG. 16 is a diagram illustrating a percent haze measurement of a polymeric container having a surface pattern of each of FIGS. 3B-3D, for purpose of illustration and comparison of the disclosed subject matter.

For purpose of understanding and not limitation, Tables 1-1 to 1-3 and 2-1 to 2-2 and the diagrams of FIGS. 15 and 16 are provided to illustrate various operational characteristics achieved by the containers disclosed herein. In one test, twenty samples each of containers 100 having raised surface patterns 110, 110' and 110" were produced. Each sample of container 100 was exposed to contact with a similarly-configured container 100 for a period of time along contact portion 108, as illustrated for example in FIG. 15. With reference to FIG. 15, an exemplary bottle-to-bottle scuffing apparatus 300 is shown. One of each sample of container 100 was joined to an electric motor 306 via rotating shaft 308. A power switch and rotational speed controller 310 was used to control electric motor 306. A similarly-configured one of each sample of container 100 was secured to stationary bottle holder 302 via bottle attachment nipple 304 and placed into contact with the sample container 100, proximate the contact portion 108 of each container, as illustrated for example in FIG. 15. A weight 312 was secured to an end of the similarly-configured container 100 via a weight hanger 314.

For purpose of illustration and not limitation, each sample container 100 and similarly configured container 100 has a volume of 2.5 L. Each sample container 100 was tested using the scuffing apparatus 300 by rotating the sample container at 60 rpm for 15 minutes with a weight of 300 grams suspended from the similarly-configured container 100.

Samples of 1" wide by 2" long were cut from the contact portion 108 of each sample container 100. Each sample was measured using a HunterLab UltraScan XE colormeter to determine a percent haze measurement using a ⅜" aperture. The haze measurement corresponds to a level of opacity of the surface of the container 100 due to aesthetic damage proximate the contact portion 108 from testing. L*, a*, b* represent a CEILAB color scale based on Opponent-Color Theory as perceived by the receptors in the human eye. The L* value indicates the level of light or dark; the a* value indicates redness or greenness, and the b* value indicates yellowness or blueness. The three values together describe the color of the sample.

TABLE 1-1

Surface Pattern 110

|  | L* | a* | b* | Haze |
|---|---|---|---|---|
| sample 1 | 93.72 | 0 | 1.52 | 31.55 |
| sample 2 | 93.81 | 0.01 | 1.48 | 28.69 |
| sample 3 | 93.77 | 0.03 | 1.54 | 28.36 |
| sample 4 | 93.91 | 0.05 | 1.51 | 32.29 |
| sample 5 | 93.79 | 0.03 | 1.49 | 28.17 |
| sample 6 | 93.7 | 0.02 | 1.55 | 28.89 |
| sample 7 | 93.74 | 0.02 | 1.49 | 33.08 |
| sample 8 | 93.81 | 0.01 | 1.46 | 31.95 |
| sample 9 | 93.72 | 0.02 | 1.52 | 30.73 |
| sample 10 | 93.69 | 0.02 | 1.54 | 30.40 |
| sample 11 | 93.91 | 0.03 | 1.48 | 27.44 |
| sample 12 | 93.7 | 0.02 | 1.54 | 30.45 |
| sample 13 | 93.6 | 0.02 | 1.51 | 31.29 |
| sample 14 | 93.6 | 0.04 | 1.82 | 30.27 |
| sample 15 | 93.49 | 0.03 | 1.67 | 31.76 |
| sample 16 | 93.61 | 0.03 | 1.59 | 32.26 |
| sample 17 | 93.65 | 0.03 | 1.5 | 30.03 |
| sample 18 | 93.62 | 0.04 | 1.53 | 31.08 |
| sample 19 | 93.47 | 0.03 | 1.61 | 34.03 |
| sample 20 | 93.55 | 0.03 | 1.58 | 32.88 |
| min | 93.47 | 0.00 | 1.46 | 27.44 |
| max | 93.91 | 0.05 | 1.67 | 34.03 |
| ave | 93.69 | 0.03 | 1.54 | 30.78 |
| stdev | 0.12 | 0.01 | 0.05 | 1.79 |

TABLE 1-2

Surface Pattern 110'

|  | L* | a* | b* | Haze |
|---|---|---|---|---|
| sample 1 | 93.77 | 0 | 1.33 | 25.03 |
| sample 2 | 93.84 | 0.01 | 1.29 | 22.39 |
| sample 3 | 93.92 | 0.01 | 1.33 | 22.89 |
| sample 4 | 93.93 | 0 | 1.29 | 21.25 |
| sample 5 | 93.79 | 0.01 | 1.33 | 22.84 |
| sample 6 | 94.09 | −0.01 | 1.13 | 20.96 |
| sample 7 | 93.98 | 0 | 1.19 | 22.19 |
| sample 8 | 94.09 | −0.02 | 1.13 | 21.89 |
| sample 9 | 94.1 | −0.01 | 1.12 | 23.33 |
| sample 10 | 94.01 | −0.02 | 1.15 | 21.04 |
| sample 11 | 93.73 | 0 | 1.23 | 25.58 |
| sample 12 | 93.43 | 0 | 1.35 | 22.08 |
| sample 13 | 93.47 | 0.01 | 1.34 | 20.80 |
| sample 14 | 93.87 | −0.02 | 1.15 | 23.08 |
| sample 15 | 93.88 | −0.01 | 1.21 | 21.50 |
| sample 16 | 93.66 | 0 | 1.32 | 26.12 |
| sample 17 | 93.83 | 0 | 1.31 | 23.30 |
| sample 18 | 93.58 | −0.02 | 1.35 | 26.56 |

TABLE 1-2-continued

Surface Pattern 110'

|  | L* | a* | b* | Haze |
|---|---|---|---|---|
| sample 19 | 93.54 | −0.01 | 1.35 | 20.62 |
| sample 20 | 93.72 | −0.01 | 1.33 | 23.45 |
| min | 93.43 | −0.02 | 1.12 | 20.62 |
| max | 94.10 | 0.01 | 1.35 | 26.56 |
| ave | 93.81 | 0.00 | 1.26 | 22.85 |
| stdev | 0.20 | 0.01 | 0.09 | 1.78 |

TABLE 1-3

Surface Pattern 110"

|  | L* | a* | b* | Haze |
|---|---|---|---|---|
| sample 1 | 93.7 | −0.04 | 1.39 | 30.25 |
| sample 2 | 93.7 | −0.05 | 1.38 | 31.30 |
| sample 3 | 93.72 | −0.03 | 1.43 | 30.10 |
| sample 4 | 93.86 | −0.01 | 1.38 | 27.98 |
| sample 5 | 93.89 | −0.02 | 1.4 | 28.11 |
| sample 6 | 93.74 | −0.01 | 1.4 | 27.63 |
| sample 7 | 93.79 | −0.03 | 1.36 | 27.49 |
| sample 8 | 93.71 | −0.02 | 1.43 | 27.51 |
| sample 9 | 93.56 | −0.04 | 1.46 | 30.71 |
| sample 10 | 93.75 | −0.04 | 1.36 | 28.34 |
| sample 11 | 93.86 | −0.01 | 1.41 | 28.90 |
| sample 12 | 93.82 | 0 | 1.41 | 29.14 |
| sample 13 | 93.69 | −0.01 | 1.5 | 29.01 |
| sample 14 | 93.8 | −0.01 | 1.4 | 28.23 |
| sample 15 | 93.89 | −0.02 | 1.37 | 27.81 |
| sample 16 | 93.73 | −0.04 | 1.38 | 29.94 |
| sample 17 | 94.02 | −0.03 | 1.28 | 25.14 |
| sample 18 | 93.81 | −0.04 | 1.29 | 26.34 |
| sample 19 | 93.83 | −0.01 | 1.38 | 25.02 |
| sample 20 | 93.93 | −0.02 | 1.31 | 25.33 |
| min | 93.56 | −0.05 | 1.28 | 25.02 |
| max | 94.02 | 0.00 | 1.50 | 31.30 |
| ave | 93.79 | −0.02 | 1.39 | 28.21 |
| stdev | 0.10 | 0.01 | 0.05 | 1.80 |

With reference to Tables 1-1 to 1-3, and as illustrated in FIG. 16, raised surface pattern 110, composing about 35% of the surface area of contact portion 108, developed on average a percent haze of 30.78%. Raised surface pattern 110', composing about 50% of the surface area of contact portion 108, developed on average a percent haze of 22.85%. Raised surface pattern 110", composing about 65% of the surface area of contact portion 108, developed on average a percent haze of 28.21%. As such, raised surface pattern 110' on average developed less visible aesthetic damage than raised surface patterns 110, 110". This can be due at least in part to raised surface pattern 110' providing the least amount of contact portion 108 exposed to contact with a similarly-configured container compared to raised surface patterns 110, 110".

In another test, 10 samples each of a container 100 having raised surface pattern 130 were produced and compared to 10 samples each of a control container without a raised surface pattern. Each sample container 100 and each control container was exposed to 25 washing and refilling cycles, and each sample container 100 and control container was measured to determine a percent haze measurement, as discussed above.

TABLE 2-1

Surface Pattern 130

|          | L*    | a*    | b*   | Haze  |
|----------|-------|-------|------|-------|
| sample 1 | 93.15 | −0.30 | 1.03 | 36.11 |
| sample 2 | 93.20 | −0.31 | 1.02 | 32.32 |
| sample 3 | 93.23 | −0.31 | 1.07 | 31.77 |
| sample 4 | 93.34 | −0.27 | 1.06 | 33.20 |
| sample 5 | 93.36 | −0.28 | 1.04 | 31.50 |
| sample 6 | 92.16 | −0.28 | 1.03 | 36.92 |
| sample 7 | 93.39 | −0.30 | 1.04 | 32.18 |
| sample 8 | 93.30 | −0.32 | 1.03 | 29.81 |
| sample 9 | 92.26 | −0.30 | 1.06 | 33.88 |
| sample 10| 93.53 | −0.28 | 0.86 | 30.18 |
| min      | 92.16 | −0.32 | 0.86 | 29.81 |
| max      | 93.53 | −0.27 | 1.07 | 36.92 |
| ave      | 93.09 | −0.30 | 1.02 | 32.79 |
| stdev    | 0.48  | 0.02  | 0.06 | 2.32  |

TABLE 2-2

Control Container

|          | L*    | a*    | b*   | Haze  |
|----------|-------|-------|------|-------|
| sample 1 | 91.71 | −0.13 | 1.36 | 76.76 |
| sample 2 | 90.76 | −0.08 | 1.58 | 88.01 |
| sample 3 | 91.10 | −0.11 | 1.57 | 85.26 |
| sample 4 | 90.93 | 0.00  | 1.46 | 89.88 |
| sample 5 | 90.49 | 0.00  | 1.66 | 90.19 |
| sample 6 | 92.29 | −0.10 | 1.14 | 70.82 |
| sample 7 | 91.29 | −0.13 | 1.37 | 80.67 |
| sample 8 | 90.95 | −0.11 | 1.36 | 84.44 |
| sample 9 | 91.88 | −0.08 | 1.19 | 76.41 |
| sample 10| 91.87 | −0.09 | 1.39 | 86.73 |
| min      | 90.49 | −0.13 | 1.14 | 70.82 |
| max      | 92.29 | 0.00  | 1.66 | 90.19 |
| ave      | 91.33 | −0.08 | 1.41 | 82.92 |
| stdev    | 0.58  | 0.05  | 0.17 | 6.51  |

With reference to Tables 2-1 to 2-2, raised surface pattern 110', composing about 50% of the surface area of contact portion 108 proximate the lower bumper thereof, developed on average a percent haze of 32.79%. For purpose of comparison and confirmation of the disclosed subject matter, the control container having no raised surface pattern proximate the lower bumper thereof developed on average a percent haze of 82.92%. As such, raised surface pattern 110' on average developed a factor of approximately 2.5 times less visible aesthetic damage than the control container.

Figure 4A:
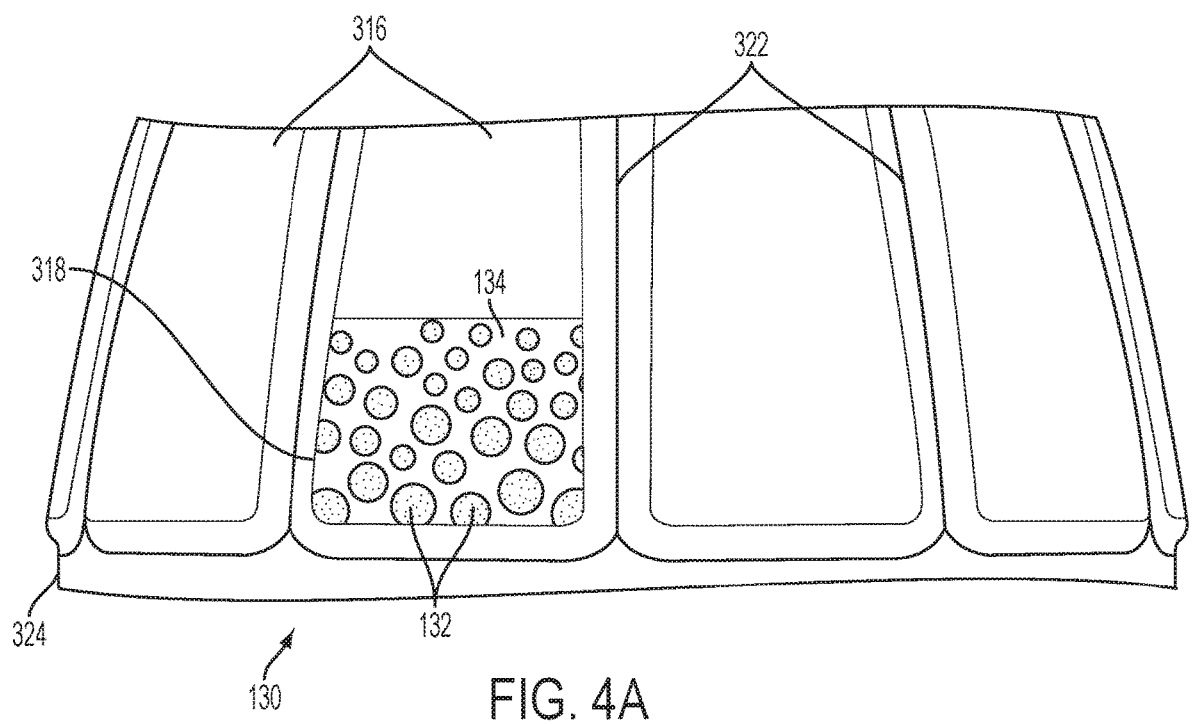
FIG. 4A is a front view of a portion of an exemplary polymeric container, illustrating an exemplary contact portion having a select area with a surface pattern in accordance with the disclosed subject matter, wherein the select area is depicted on a single flute for purpose of illustration and not limitation.
Figure 4B:
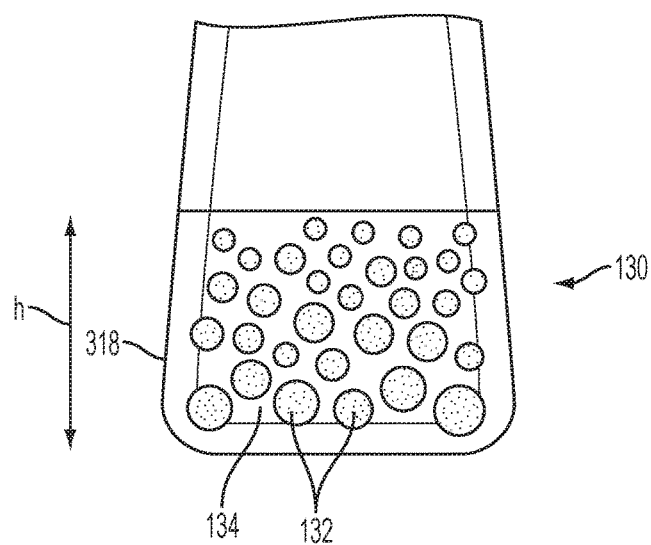
FIG. 4B is an enlarged schematic view of region 4B of FIG. 4A.
Figure 5:
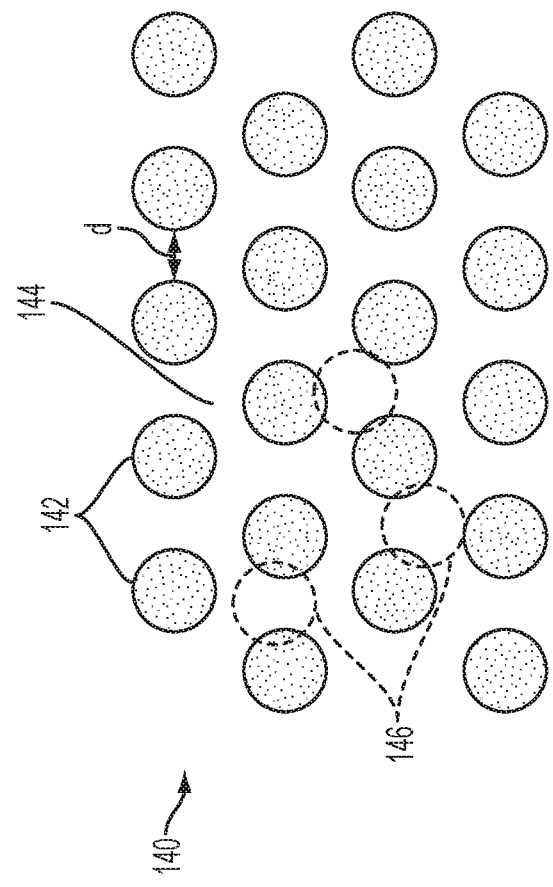

Referring now to FIGS. 4A-4B, an alternative embodiment of a select area having a raised surface pattern 310 is depicted. As shown in FIGS. 4A-4B, contact portion 318 is disposed at an alternative location. Contact portion 318 can be provided alone, or in combination with additional contact portions, as described herein. For example and without limitation, contact portion 318 can be disposed within flutes 316 formed proximate recess 324. For purpose of illustration and simplicity, only one select area is depicted. The select area proximate contact portion 318 can have any raised surface pattern described herein. For example, and as embodied herein, the select area proximate contact portion 318 has a raised surface pattern 130 with protrusions 132 having a circular shapes of varying sizes. As embodied herein, protrusions 132 can generally have a larger diameter proximate a cross-section of contact portion 318 having a larger cross dimension, and can have a generally smaller diameter proximate a cross-section of contact portion 318 having a smaller cross dimension. As such, the surface area formed by protrusions 132 can be greater as the cross dimension of contact portion 318 increases.

With reference now to FIGS. 5-14B, additional or alternative raised surface patterns can be utilized in accordance with the disclosed subject matter. As discussed herein, for example and without limitation, in accordance with the disclosed subject matter, raised surface patterns can have protrusions spaced apart a shortest distance from any adjacent protrusions less than a greatest surface dimension of the protrusions such that a similarly-configured protrusion generally cannot fit within a recessed space defined by protrusions. For example, and without limitation, with reference to FIG. 5, raised surface pattern 140 has circular protrusions 142 spaced apart a shortest distance d such that similarly-configured protrusions 146, illustrated in phantom overlaid thereon, cannot fit entirely into recessed space 144 defined between protrusions 142.

Figure 6:
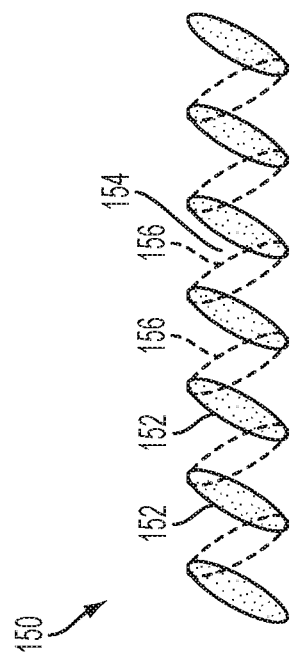

Referring now to FIG. 6, raised surface pattern 150 has elongated elliptical protrusions 152. Raised surface pattern 150 can be configured, as embodied herein, such that mirror image protrusions 156, illustrated in phantom overlaid thereon, cannot fit entirely into recessed space 154 defined between protrusions 152.

Figure 8:
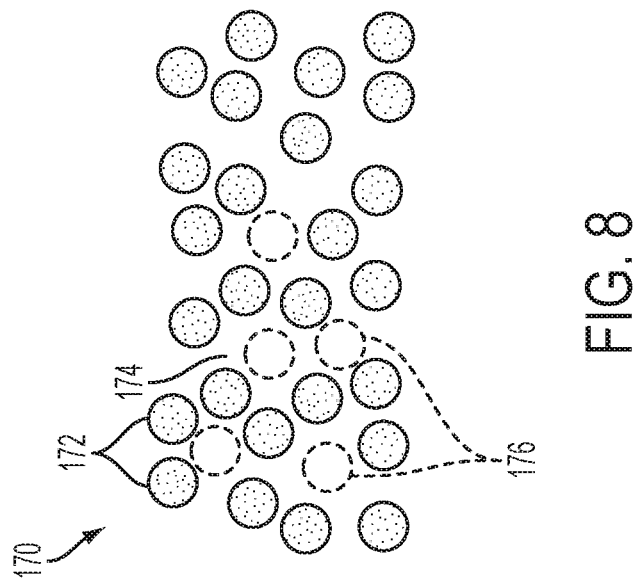
Figure 7:
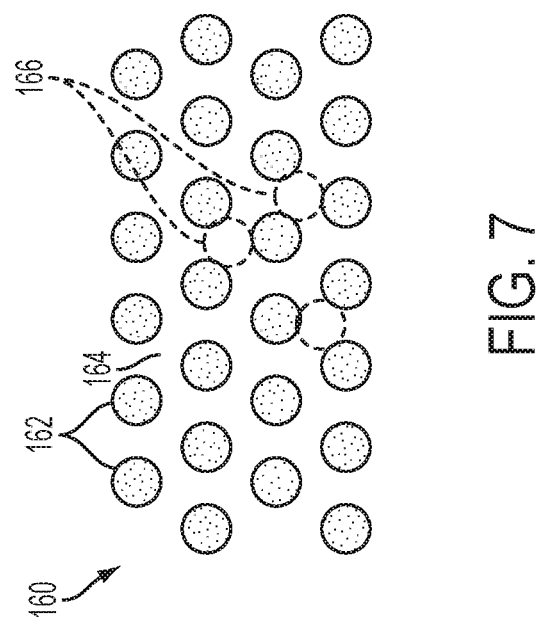

Referring now to FIG. 7, raised surface pattern 160 has circular protrusions 162 evenly spaced such that similarly configured protrusions 166, illustrated in phantom overlaid thereon, cannot fit entirely into recessed space 164 defined between protrusions 162. By comparison, with reference to FIG. 8, raised surface pattern 170 has the same number of protrusions 172 having the same size as protrusions 162, but with varied spacing between protrusions 172. As such, as shown for example in FIG. 8, similarly-configured protrusions 176, illustrated in phantom overlaid thereon, can fit entirely into at least a portion of recessed space 174 defined between some protrusions 172. FIG. 8 can be suitable to reduce scuffing compared to a smooth surface. However, FIG. 8 can be less suitable to reduce scuffing, for example, proximate the recessed spaces 174 formed by protrusions 172 spaced apart a distance greater than a greatest surface dimension thereof such that similarly-configured protrusions 176 can fit within the recessed spaces 174.

Figure 9:
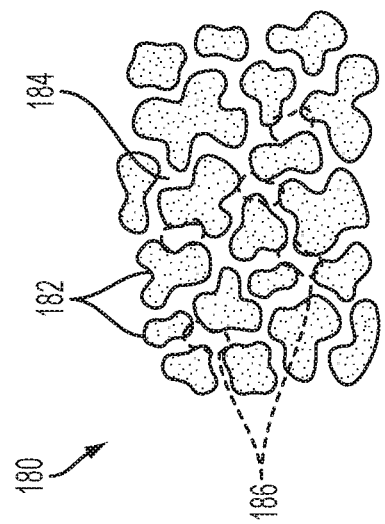

With reference to FIG. 9, raised surface pattern 180 has irregularly shaped protrusions 182 of varying sizes and uneven spacing. As embodied herein, protrusions 182 of surface pattern 180 can be spaced apart less than a greatest surface dimension, embodied herein as a length, of any of protrusions 182 to form recessed spaces 184. As such, any similarly-configured protrusions 186 having a greatest surface dimension similar to any of protrusions 182 cannot fit entirely into any recessed space 184 defined between protrusions 182.

Figure 10:
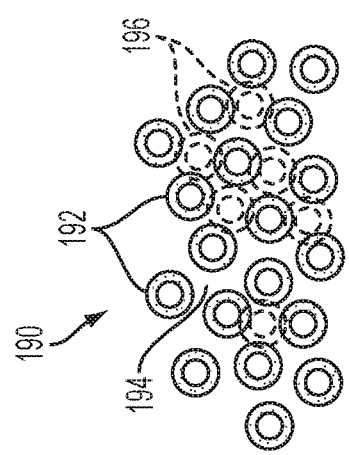

Referring now to FIG. 10, raised surface pattern 190 has annular shaped protrusions 192 of equal size and uneven spacing. As embodied herein, protrusions 192 of surface pattern 190 can be arranged such that any similarly-configured protrusions 196 cannot fit entirely into recessed space 194 defined between protrusions 192.

Figure 11:
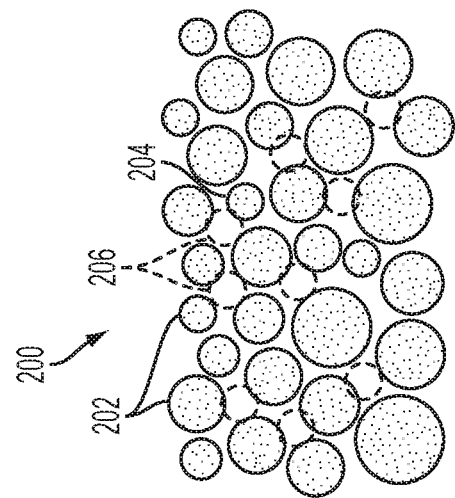

Referring now to FIG. 11, raised surface pattern 200 can have circular protrusions 202 of unequal size and uneven spacing. As embodied herein, protrusions 202 of surface pattern 200 can be arranged such that any similarly-configured protrusions 206 having a greatest surface dimension similar to any of protrusions 202 cannot fit entirely into recessed space 204 defined between protrusions 202.

Figure 12:
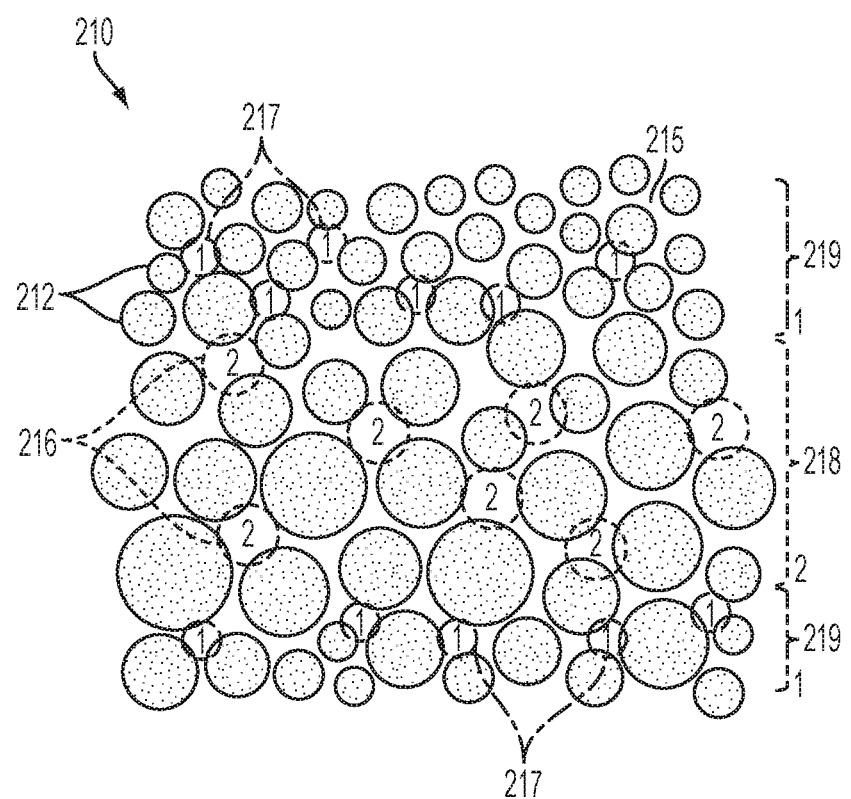

With reference to FIG. 12, a select area having a raised surface pattern can be separated into zones. For example, as embodied herein, raised surface pattern 210 can have zones 218, 219 defined along the height of a contact portion, with zone 219 disposed on one or both opposing sides of zone 218. Additionally or alternatively, zone 219 can be disposed outside the contact area of the container, so as not to be susceptible to scuffing. In this manner, alternative sizes of protrusions can be provided in zone 219. Raised surface pattern 210 can have circular protrusions 212 of unequal size and uneven spacing. As embodied herein, protrusions 212 of zone 218 can be larger than the smallest protrusions 212 of zone 219. As such, surface pattern 210 can be configured such that any similarly-configured protrusions 216 having a greatest surface dimension similar to any protrusions 212 in zone 218 cannot fit entirely within recessed space 215 defined therebetween, and such that any similarly-configured protrusions 217 having a greatest surface dimension similar to any protrusions 212 in zone 219 cannot fit entirely within recessed space 215 defined therebetween.

Referring now to FIG. 13, raised surface pattern 150 is illustrated side-by-side with alternative raised surface pattern 220, for purpose of comparison. As embodied herein, raised surface pattern 220 has protrusions 222 shaped similar to protrusions 152, but more densely spaced. As such, raised surface pattern 220 has less recessed space 224 defined between protrusions 222, and similarly-configured protrusions 226 cannot fit entirely within recessed space 224. In this manner, the recessed space 224 between protrusions can be less susceptible to scuffing due to contact with a hard surface.

Figure 14B:
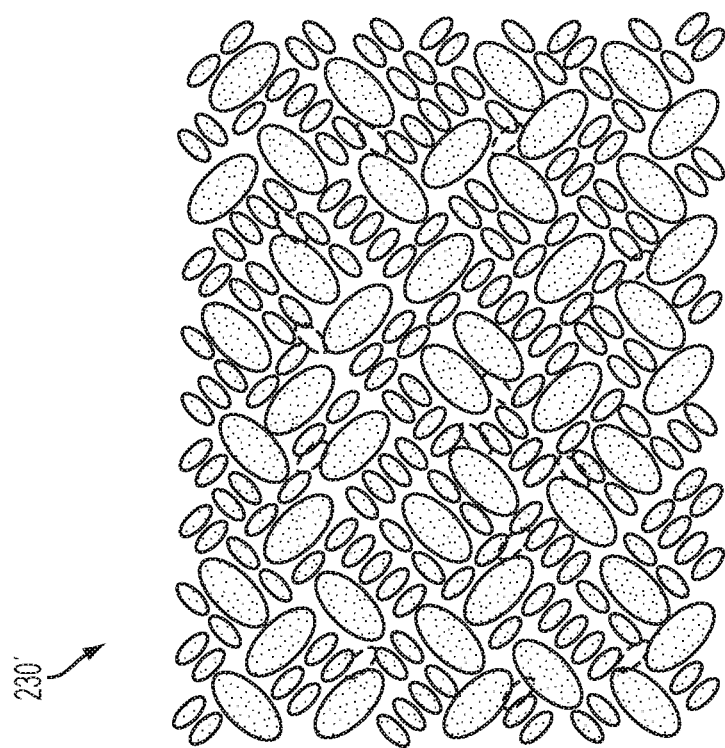
Figure 14A:
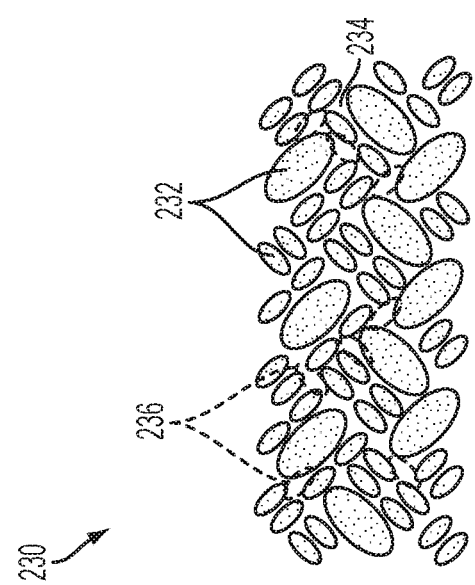

With reference to FIGS. 14A-14B, raised surface pattern 230 can have elongated elliptical protrusions 232 having varying sizes and orientations. As embodied herein, protrusions 232 of surface pattern 230 can be arranged such that any similarly-configured protrusions 236 having a greatest surface dimension similar to any of protrusions 232 cannot fit entirely into recessed space 234 defined between protrusions 232. As illustrated in FIG. 14B, raised surface pattern 230 can be scaled, extended or repeated to fill any size surface of the container 100 where additional protection against aesthetic damage due to surface contact is desired. Scaled, extended or repeated raised surface patterns can have any of the characteristics or features described herein.

Figure 17:
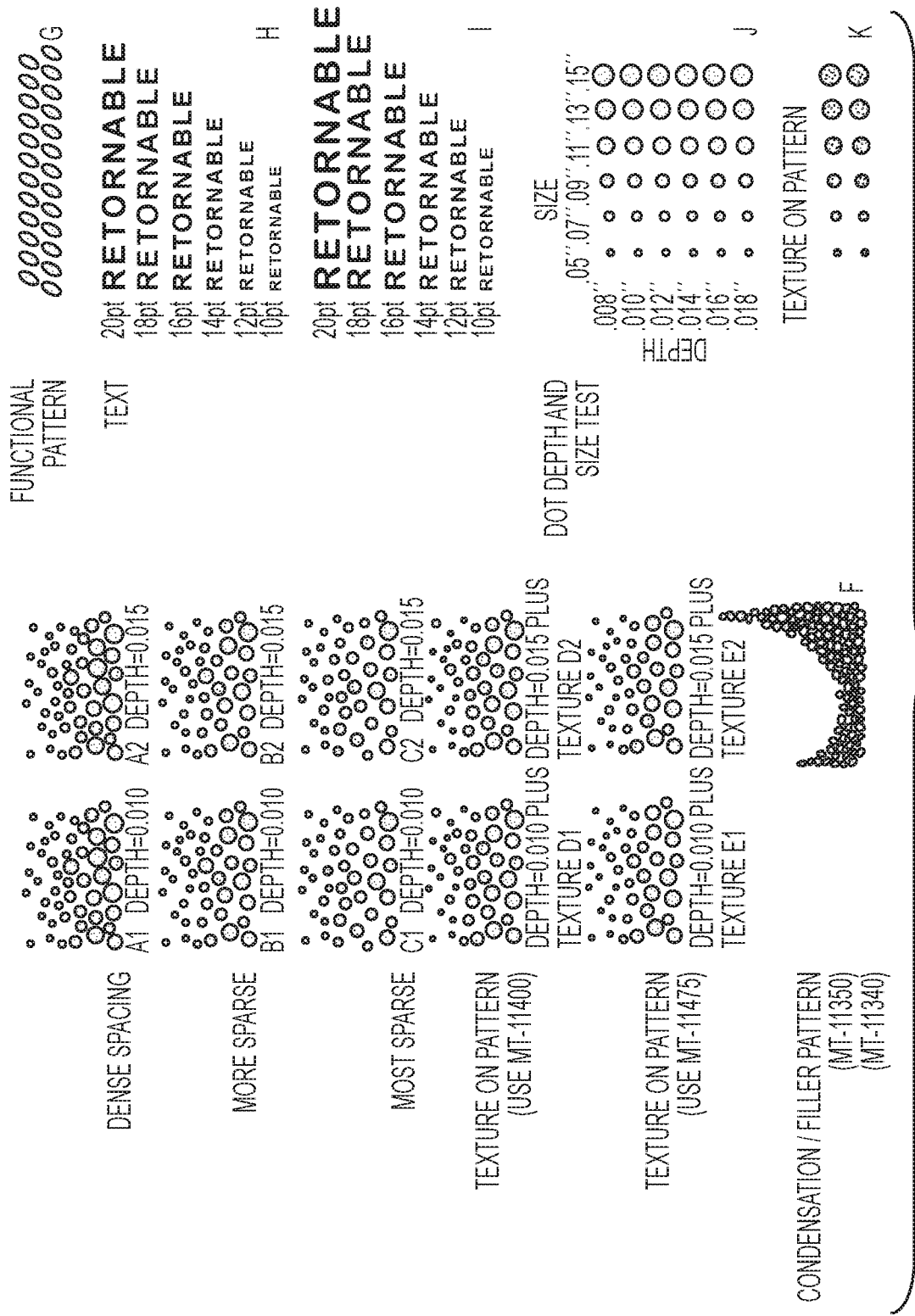
FIG. 17 is a diagram illustrating additional embodiments of exemplary surface patterns according to the disclosed subject matter.

With reference now to FIGS. 17-20E, additional or alternative raised surface patterns can be utilized in accordance with the disclosed subject matter. For example, and as depicted in FIG. 17, protrusions of raised surface patterns can have a substantially smooth, even surface. Alternatively, protrusions of raised surface patterns can have an uneven or rough textured surface. Additionally or alternatively, protrusions of raised surface patterns can be arranged to provide aesthetic designs. For example and without limitation, and as embodied herein, raised surface patterns can be arranged to resemble condensation on the surface of the container or carbonation of a beverage contained within the container. In this manner, raised surface patterns can be disposed outside the contact portion to provide an aesthetic design complementing a raised surface pattern within an adjacent contact area. As a further alternative, protrusions of raised surface patterns can be provided with the shape of letters, numbers or any other suitable symbols, icons or graphics.

Figure 18:
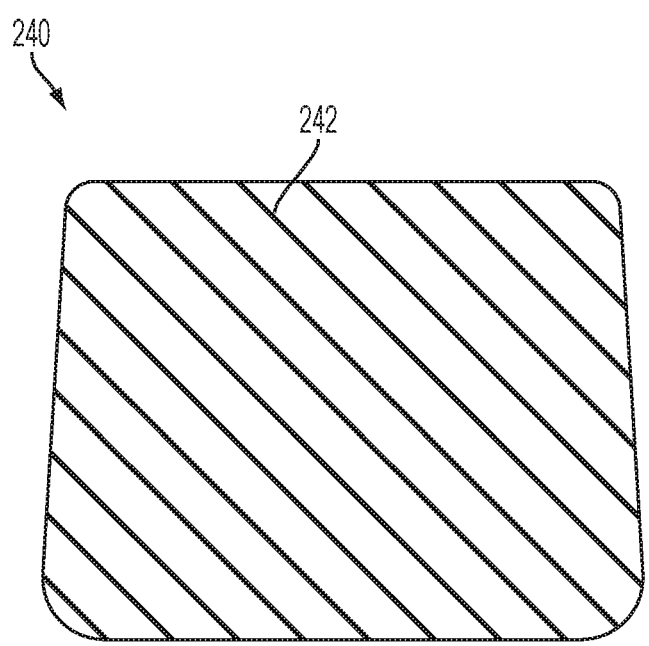
FIGS. 18-20E each is a diagram illustrating a further embodiment of an exemplary surface pattern according to the disclosed subject matter.
Figure 19A:
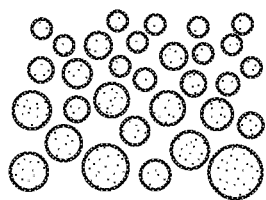
Figure 19B:
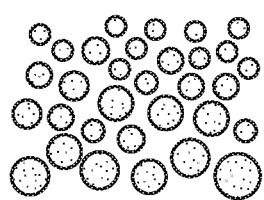
Figure 19C:
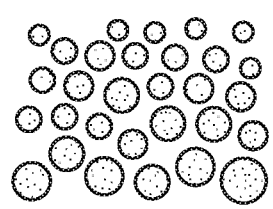
Figure 19D:
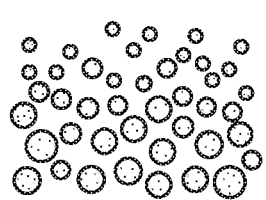
Figure 19E:
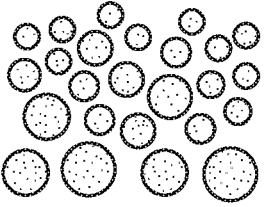
Figure 19F:
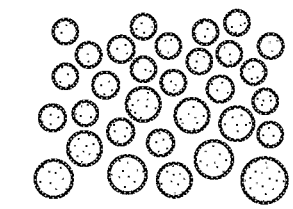
Figure 20A:
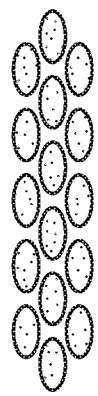
Figure 20B:
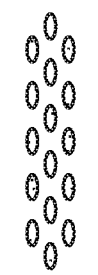
Figure 20C:
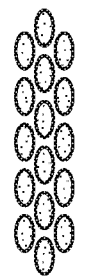
Figure 20D:
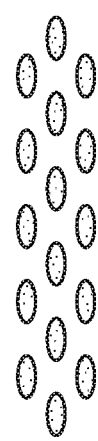
Figure 20E:

Referring now to FIG. 18, an additional or alternative raised surface pattern 240 is illustrated. For example and without limitation, as embodied herein, raised surface pattern 240 can be configured as a brushed or etched pattern, and can include a number of brushed or etched surfaces 242 defining the raised surface pattern 240.

Referring now to FIGS. 19A-19F, additional or alternative variations of raised surface patterns are illustrated. For example, and as embodied herein, raised surface patterns can include circular protrusions of varying size, shape and density.

With reference to FIGS. 20A-20E, additional or alternative variations of raised surface patterns are illustrated. For example, and as embodied herein, raised surface patterns can include elongated, elliptical protrusions of varying size, shape and density.

For example and without limitation, as embodied herein, protrusions of raised surface patterns according to the disclosed subject matter can be provided with different sizes. For example and without limitation, as embodied herein, protrusions can have a greatest surface dimension within a range of 0.05" to 0.25". Additionally or alternatively, protrusions of raised surface patterns can be provided with different depths. For example and without limitation, raised surface patterns can have protrusions having a uniform depth. Alternatively, raised surface patterns can have protrusions having a varying depth. As embodied herein, for example and without limitation, protrusions of raised surface patterns can have a depth within a range of 0.008" to 0.018" relative to recessed portions of a contact surface area.

In accordance with another aspect of the disclosed subject matter, a method of forming a polymeric container having the features described herein is provided. The method includes providing a base defining a support surface, forming a sidewall extending upwardly from the base, the sidewall having at least a first contact portion extending about a perimeter of the sidewall, and forming a raised surface pattern at a select area proximate the first contact portion, the raised surface pattern comprising a plurality of protrusions spaced within the selected area. The polymeric container can include any features or modifications as described above or otherwise known.

The various embodiments of the container as disclosed herein can be formed by conventional molding techniques as known in the industry. For example, the container can be formed by blow-molding, which can be performed with or without a movable cylinder. Additionally or alternatively, the raised surface patterns can be formed by molding, pressing, stamping, adhesion, or any other suitable technique.

In addition to the specific embodiments claimed below, the disclosed subject matter is also directed to other embodiments having any other possible combination of the dependent features claimed below and those disclosed above. As such, the particular features disclosed herein can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A polymeric container, comprising: a base defining a support surface; and
   a sidewall extending upwardly from the base, the sidewall having at least a first contact portion extending about a perimeter of the sidewall;
   wherein the sidewall includes a raised surface pattern at a select area proximate the first contact portion, the raised surface pattern having a percent haze measurement within a range of about 20 to 36 percent and comprising a plurality of protrusions each extending outwardly from the sidewall and having an outer surface, the plurality of protrusions configured to provide scuff resistance of the sidewall between adjacent protrusions, each protrusion spaced apart from adjacent protrusions within the select area, a shortest distance between the outer surface of each protrusion and the outer surface of the adjacent protrusions being less than a greatest surface dimension of the outer surface of each protrusion.

2. The polymeric container of claim 1, wherein the plurality of protrusions are arranged in a nonuniform pattern within the select area and the nonuniform pattern is defined at least in part by nonuniform spacing between adjacent protrusions within the select area.

3. The polymeric container of claim 1, wherein the plurality of protrusions are arranged in a nonuniform pattern within the select area and the nonuniform pattern is defined at least in part by the plurality of protrusions having nonuniform sizes within the select area.

4. The polymeric container of claim 1, wherein the plurality of protrusions are arranged in a nonuniform pattern within the select area and the nonuniform pattern is defined at least in part by the plurality of protrusions having nonuniform shapes within the select area.

5. The polymeric container of claim 1, wherein the plurality of protrusions are arranged in a nonuniform pattern within the select area and the nonuniform pattern is defined at least in part by nonuniform spacing between adjacent protrusions within the select area and the plurality of protrusions having nonuniform sizes within the select area.

6. The polymeric container of claim 5, wherein the nonuniform pattern of the plurality of protrusions provides the appearance of condensation.

7. The polymeric container of claim 1, wherein each protrusion of the surface pattern has a circular shape.

8. The polymeric container of claim 1, wherein each protrusion of the surface pattern has an elliptical shape.

9. The polymeric container of claim 1, wherein each protrusion of the surface pattern has an irregular shape.

10. The polymeric container of claim 1, wherein the select area has a geometrically uniform boundary proximate the first contact portion.

11. The polymeric container of claim 1, wherein the select area has an irregular boundary proximate the first contact portion.

12. The polymeric container of claim 1, wherein the first contact portion is formed as a bumper proximate the base.

13. The polymeric container of claim 1, wherein the first contact portion is formed as at least one flute along a height of the sidewall.

14. The polymeric container of claim 1, further comprising a second contact portion spaced from the first contact portion along a height of the sidewall, the select area further being disposed proximate the second contact portion.

15. The polymeric container of claim 1, wherein the first contact portion has a percent haze measurement within a range of about 22 percent to 31 percent after engaging a similarly-configured container at 60 rpm for 15 minutes.

16. The polymeric container of claim 1, wherein each protrusion is spaced apart from each adjacent protrusion to define a recess therebetween, and each protrusion is sized such that the outer surface of none of the protrusions fits entirely within any of the recesses.

17. The polymeric container of claim 1, wherein the first contact portion has a surface area and the plurality of protrusions comprise about 35 to 65 percent of the surface area of the first contact portion.

18. The polymeric container of claim 1, wherein the first contact portion has recesses and each protrusion has a depth within a range of about 0.008 inches to 0.018 inches relative to the recesses of the first contact portion.

19. The polymeric container of claim 18, wherein the first contact portion has a surface area and the plurality of protrusions comprise about 35 to 65 percent of the surface area of the first contact portion.

20. A method of forming a polymeric container, comprising:
    providing a base defining a support surface;
    forming a sidewall extending upwardly from the base, the sidewall having at least a first contact portion extending about a perimeter of the sidewall; and
    forming a raised surface pattern at a select area proximate the first contact portion, the raised surface pattern having a percent haze measurement within a range of about 20 to 36 percent and comprising a plurality of protrusions each extending outwardly from the sidewall and having an outer surface, the plurality of protrusions configured to provide scuff resistance of the sidewall between adjacent protrusions, each protrusion spaced apart from adjacent protrusions within the select area, a shortest distance between the outer surface of each protrusion and the outer surface of the adjacent protrusions being less than a greatest surface dimension of the outer surface of each protrusion.

21. The method of claim 20, wherein the plurality of protrusions are arranged in a nonuniform pattern within the select area and the nonuniform pattern is defined at least in part by nonuniform spacing between adjacent protrusions within the select area.

22. The method of claim 20, wherein the plurality of protrusions are arranged in a nonuniform pattern within the select area and the nonuniform pattern is defined at least in part by the plurality of protrusions having nonuniform sizes within the select area.

23. The method of claim 20, wherein the plurality of protrusions are arranged in a nonuniform pattern within the select area and the nonuniform pattern is defined at least in part by the plurality of protrusions having nonuniform shapes within the select area.

24. The method of claim 20, wherein the plurality of protrusions are arranged in a nonuniform pattern within the select area and the nonuniform pattern is defined at least in part by nonuniform spacing between adjacent protrusions within the select area and the plurality of protrusions having nonuniform sizes within the select area.

25. The method of claim 24, wherein the nonuniform pattern of the plurality of protrusions provides the appearance of condensation.

26. The method of claim 20, wherein each protrusion of the surface pattern has a circular shape.

27. The method of claim 20, wherein each protrusion of the surface pattern has an elliptical shape.

28. The method of claim 20, wherein each protrusion of the surface pattern has an irregular shape.

29. The method of claim 20, wherein the select area has a geometrically uniform boundary proximate the first contact portion.

30. The method of claim 20, wherein the select area has an irregular boundary proximate the first contact portion.

31. The method of claim 20, wherein the first contact portion is formed as a bumper proximate the base.

32. The method of claim 20, wherein the first contact portion is formed as at least one flute along a height of the sidewall.

33. The method of claim 20, further comprising a second contact portion spaced from the first contact portion along a height of the sidewall, the select area further being disposed proximate the second contact portion.

34. The method of claim 20, wherein the first contact portion has a percent haze measurement within a range of about 22 percent to 31 percent after engaging a similarly-configured container at 60 rpm for 15 minutes.

35. The method of claim 20, wherein each protrusion is spaced apart from each adjacent protrusion to define a recess therebetween, and each protrusion is sized such that the outer surface of none of the protrusions fits entirely within any of the recesses.

36. The method of claim 20, wherein the first contact portion has a surface area and the plurality of protrusions comprise about 35 to 65 percent of the surface area of the first contact portion.

37. The method of claim 20, wherein the first contact portion has recesses and each protrusion has a depth within a range of about 0.008 inches to 0.018 inches relative to the recesses of the first contact portion.

38. The method of claim 37, wherein the first contact portion has a surface area and the plurality of protrusions comprise about 35 to 65 percent of the surface area of the first contact portion.

39. A polymeric container, comprising:
a base defining a support surface; and
a sidewall extending upwardly from the base, the sidewall having at least a first contact portion extending about a perimeter of the sidewall and having recesses;
wherein the sidewall includes a raised surface pattern at a select area proximate the first contact portion, the raised surface pattern comprising a plurality of protrusions each extending outwardly from the sidewall and having an outer surface, the plurality of protrusions configured to provide scuff resistance of the sidewall between adjacent protrusions, each protrusion spaced apart from adjacent protrusions within the select area, a shortest distance between the outer surface of each protrusion and the outer surface of the adjacent protrusions being less than a greatest surface dimension of the outer surface of each protrusion, and each protrusion having a depth within a range of about 0.008 inches to 0.018 inches relative to the recesses of the first contact portion.

* * * * *